(12) United States Patent
May (10) Patent No.: US 9,605,696 B1
(45) Date of Patent: Mar. 28, 2017

(54) DETACHABLE MAGNETIC RETAINERS

(71) Applicant: David Glen May, Little Rock, AR (US)

(72) Inventor: David Glen May, Little Rock, AR (US)

( * ) Notice: Subject to any disclaimer, the term of this patent is extended or adjusted under 35 U.S.C. 154(b) by 0 days.

(21) Appl. No.: 14/158,378

(22) Filed: Jan. 17, 2014

Related U.S. Application Data (60) Provisional application No. 61/753,700, filed on Jan. 17, 2013.

(51) Int. Cl.
| | | |
|---|---|---|
| *H04M 1/00* | (2006.01) | |
| *F16B 1/00* | (2006.01) | |
| *F16B 4/00* | (2006.01) | |
| *H01F 7/00* | (2006.01) | |
| *H04M 1/04* | (2006.01) | |

(52) U.S. Cl.
CPC .............. *F16B 1/00* (2013.01); *F16B 4/00* (2013.01); *H01F 7/00* (2013.01); *H04M 1/04* (2013.01)

(58) Field of Classification Search
CPC ... H04B 1/3888; A45C 2011/002; F16B 1/00; F16B 4/00; H01F 7/00; H04M 1/04
USPC ............. 455/575.1, 575.3, 575.6, 575.7
See application file for complete search history.

(56) References Cited

U.S. PATENT DOCUMENTS

| | | | |
|---|---|---|---|
| 2,623,256 A | 12/1952 | Feibelman | |
| 2,975,497 A * | 3/1961 | Budreck | A44B 15/002 24/303 |
| 3,129,477 A | 4/1964 | Mizuno | |
| 4,901,405 A | 2/1990 | Grover | |
| 5,050,276 A | 9/1991 | Pemberton | |
| 5,197,168 A | 3/1993 | Levy | |
| 5,317,789 A * | 6/1994 | Levy | A44C 5/2042 24/303 |
| 5,992,807 A | 11/1999 | Tarulli | |
| 6,149,116 A | 11/2000 | Won | |
| 6,367,126 B1 | 4/2002 | Rivkin | |
| 6,483,719 B1 * | 11/2002 | Bachman | H05K 9/003 174/378 |
| 6,640,398 B2 | 11/2003 | Hoffman | |
| 6,836,899 B1 * | 1/2005 | Glasmire | A45F 5/04 2/323 |
| 6,888,940 B1 | 5/2005 | Deppen | |
| 6,945,503 B2 | 9/2005 | Cohen | |
| D159,542 S | 4/2006 | Goodman | |
| 7,172,283 B1 | 2/2007 | Asta | |
| 7,296,889 B2 | 11/2007 | Dietz | |

(Continued)

*Primary Examiner* — Md Talukder (74) *Attorney, Agent, or Firm* — Stephen D. Carver (57) ABSTRACT

Magnetic retainers for detachably holding and suspending items such as cell phones from a user or support comprise a hanger and a holder that are magnetically coupled together. The holder is removably attached to an item such as a cell phone, and the hanger is removably suspended from the phone user. The hanger selectively, detachably couples to the harness with vertically aligned permanent magnets. The hanger may comprise a loop, clip, or lanyard that is worn or held by the user or attached to a static support. The holder is retrofitted to cell phone structure with a flexible, anti-slip sticky-tape connection that is removably, adhesively secured between parts of the cell phone body, its interior, or its case, being sandwiched and restrained between abutting parts. Magnets are permanently attached to remote ends or portions of the hanger and holder through either a shrink wrap connection or a snap fitting arrangement.

2 Claims, 12 Drawing Sheets

(56) References Cited

U.S. PATENT DOCUMENTS

| | | | |
|---|---|---|---|
| 7,431,251 B2 | 10/2008 | Carnevali | |
| 7,441,917 B1* | 10/2008 | Underdown | A44C 15/0015 362/103 |
| 7,496,991 B2 | 3/2009 | Avery | |
| 7,553,018 B1 | 6/2009 | Riazi | |
| 7,661,644 B1* | 2/2010 | Yen | A47G 29/083 223/120 |
| 7,708,421 B2 | 5/2010 | Underdown | |
| 7,726,152 B2 | 6/2010 | Beard | |
| 7,857,445 B2 | 12/2010 | Jodoin | |
| 7,889,036 B2* | 2/2011 | Fiedler | H01F 7/0263 292/251.5 |
| 8,220,188 B1* | 7/2012 | Keller | G09F 7/04 40/593 |
| 9,170,473 B1* | 10/2015 | Li | G03B 17/561 |
| 2004/0154143 A1 | 8/2004 | Harrell | |
| 2006/0124676 A1* | 6/2006 | Mastrosimone | A45F 5/00 224/257 |
| 2006/0152358 A1* | 7/2006 | Osterweil | G08B 21/0461 340/539.13 |
| 2007/0176069 A1* | 8/2007 | Mitchell | A47G 23/0225 248/311.2 |
| 2007/0212931 A1* | 9/2007 | Livingston | A45F 5/00 439/501 |
| 2008/0115396 A1* | 5/2008 | Gamboa | G09F 21/02 40/661 |
| 2008/0134474 A1* | 6/2008 | Uryasov | A45F 5/02 24/303 |
| 2009/0021333 A1* | 1/2009 | Fiedler | H01F 7/0263 335/285 |
| 2009/0095854 A1* | 4/2009 | Forbes | F16M 11/40 248/176.3 |
| 2009/0120980 A1* | 5/2009 | Calayo | A45F 5/021 224/257 |
| 2009/0133229 A1* | 5/2009 | Kogen | A44C 5/2042 24/303 |
| 2009/0141886 A1* | 6/2009 | Pierson | A45C 11/00 379/449 |
| 2009/0256665 A1* | 10/2009 | Cheng | B60R 11/02 335/290 |
| 2009/0306686 A1* | 12/2009 | Ohdaira | A61B 17/02 606/148 |
| 2010/0008028 A1* | 1/2010 | Richardson | G06F 1/1626 361/679.01 |
| 2010/0240345 A1* | 9/2010 | Karrman | H04M 1/6066 455/414.1 |
| 2011/0011906 A1* | 1/2011 | Musgrave | A45F 5/02 224/269 |
| 2011/0149570 A1* | 6/2011 | Wenzlick | F21L 14/023 362/249.02 |
| 2011/0163211 A1* | 7/2011 | Cicco | B60R 11/02 248/158 |
| 2011/0252609 A1* | 10/2011 | Rothbaum | H01F 7/0263 24/306 |
| 2012/0155955 A1* | 6/2012 | Yap | A45C 13/1092 403/289 |
| 2012/0190303 A1* | 7/2012 | Wong | A61B 7/02 455/41.2 |
| 2013/0005401 A1* | 1/2013 | Rosenhan | G06F 1/1626 455/557 |
| 2013/0214019 A1* | 8/2013 | Wu | B62J 11/00 224/413 |
| 2014/0043582 A1* | 2/2014 | Paydar | G02C 3/00 351/155 |
| 2014/0166658 A1* | 6/2014 | Hamra | A45F 5/00 220/500 |
| 2014/0370880 A1* | 12/2014 | Yang | H04N 5/23203 455/419 |
| 2016/0120295 A1* | 5/2016 | Rowley | A45F 5/00 248/346.06 |

* cited by examiner

DETACHABLE MAGNETIC RETAINERS

CROSS REFERENCE TO RELATED APPLICATION

This application is based upon a previously filed U.S. Provisional patent application, Ser. No. 61/753,700, filed Jan. 17, 2013, and entitled "Detachable Magnetic Cell Phone Holders," by inventor David Glen May, and priority based on said provisional application is hereby claimed.

BACKGROUND OF THE INVENTION

I. Field of the Invention

The present invention relates generally to retaining devices such as hangers or holders or and lanyards for magnetically holding various devices. More particularly, the present invention relates to detachable, magnetic retainers comprising detachable hangers that are magnetically coupled to detachable holders that removably or temporarily hold or restrain miscellaneous devices including cell phones and their accessories, UPC scanners, electronic instruments and devices, vapor cigarettes, key chains, miscellaneous tools and the like.

II. Description of the Prior Art

Portable electronic cell phones are ubiquitous in modern life. These relatively small electronic devices are carried by almost everyone, and they provide reliable communications throughout the world. They are commonly used in vehicles, automobiles, trucks, recreational vehicles and the like where they can be difficult to conveniently store within easy reach of a driver. It is often difficult to conveniently stow handheld cell phone within a vehicle interior as a proper receptacle to storage compartment is seldom available within vehicle interiors.

When transported by an individual, hand-held units can be carried upon the user's person or within brief cases, pockets, or purses. Often cell phones fall out of a user's hands or pockets, resulting in loss or damage. Even when carried within a brief case or a large purse, they can be difficult to retrieve within the maze of other personal objects carried by the user.

Modern cell phones usually include a small, plastic, rectangular housing formed of molded plastic, within which a digital electronic circuit, an antenna, a battery and associated components are secured. Typically at least one plastic backing or covering is removable to expose the battery or other internal components. In most units the battery is supported at the rear of the cell phone housing to maximize the available front surface to be used for controls and display. The battery or battery pack is secured to the housing by a snap-latch mechanism which is sufficiently reliable and secure to support the weight of the entire cell phone. In some manufacture devices, the battery pack includes an integral clip or holding attachment suitable for securing to the user's belt or purse or other convenient areas. The front usually mounts a display and plurality of icons for dialing and controlling the phone. The sides and ends of a typical cell phone mount a plurality of input and output jacks or connections adapted for headphones, Bluetooth devices, USB computer connections, re-chargers, external amplifiers or headphones and the like.

A variety of retainers or holding devices have been proposed in the art for maintaining cell phones in convenient locations. Holding devices using the magnetic holding force of permanent magnets are known in the prior art. Typically a strong magnet at one end of a device embraces a similar magnet or magnetically attractive ferrous article in a neighboring device. When a pair of magnets are arranged so that their opposite poles face each other, a strong binding attractive force results.

Conventional mechanisms to attach a cell phone to a lanyard or hanger align the magnets or ferrous materiel in a direction that minimizes manufacturing costs. This direction is usually transverse to the longitudinal axis of the cell phone, for example. This inferior alignment design enables a sliding effect downwardly, as the magnetic pull strength is not maximized. Also, some prior designs have a magnet that is permanently attached to the phone or phone case, but it is neither removably attached nor designed for after market installation.

The known prior art fails to reveal after-market cell phone attachments or accessories that are removably attached to the cell phone or other device by the user, and which include magnets for removably suspending or coupling the cell phone to a lanyard or hanger detachably worn by the user.

U.S. Pat. No. 3,129,477 issued Apr. 21, 1964 discloses a releasable and separable magnetic jewelry clasp for a bracelet, necklace, or the like. The clasp comprises a pair of ferrules joined to the main body. A first magnet extends from one of the ferrules and is received by a bore present in the other ferrule, and a second magnet or magnetically receptive metal member is disposed within the bore. When the two ferrules are joined, the first magnet abuts the second magnet or metal member in order to maintain the clasp closed.

U.S. Pat. No. 4,901,405 issued Feb. 20, 1990 discloses a self-aligning magnetic necklace clasp. A cylindrical insert fits through a retainer ring into a tubular chamber in which it is held by a magnetic structure.

U.S. Pat. No. 5,050,276 issued Sep. 24, 1991 discloses a magnetic clasp comprising two mirror image halves, each of which is attached to the ends of a necklace. Each half has a magnetic shell and an inserted magnetic core. The shell has a cylindrical body with a cone-shaped end. The magnetic core is made of samarium cobalt or neodymium iron. Both are strong magnets and allow the clasp to be very small in size so that it is aesthetically pleasing. The end of each half has an eyelet for connecting to a necklace. A conventional fastener can be soldered to one eyelet so that the clasp can be added to an existing necklace. A safety catch can be added to the clasp as a back-up safety feature for expensive jewelry.

U.S. Pat. No. 5,197,168 issued Levy Mar. 30, 1993 discloses magnetic jewelry closures that may be used as a replacement clasp for jewelry.

U.S. Pat. No. 5,992,807 issued Nov. 30, 1999 discloses a magnetic stand for cell phones. A cell phone is removably attached to the dashboard of a vehicle by a magnet that is permanently secured to the dashboard of a vehicle. The cell phone is removably retained by the magnet (due to the attraction between the magnet and the metal parts normally found in the cell phone) and the cell phone may be lifted off manually and manually replaced on the magnet.

U.S. Pat. No. 6,640,398 issued Hoffman Nov. 4, 2003 discloses a magnetic clasp for jewelry wherein separable bodies are temporarily fastened together by magnets that have been poled to present opposed surfaces of opposite magnetic polarities. In a first embodiment, disk-like magnets are received in channels of mating elongated body members of like configuration. End flanges of the elongated body members, in addition to the disk-like magnets, provide axial resistance to separation while the resultant magnetic force prevents separation in the transverse direction. In a second embodiment, disk-like magnets of divided polarities are seated at ends of mating bodies. A pin-and-slot locking mechanism is formed in the two bodies and the magnets are oriented relative thereto so that resultant repulsive magnetic forces force the two magnets into mating alignment when in the longitudinal slot for maximum magnetic holding force.

U.S. Pat. No. 6,149,116 issued Nov. 21, 2000 discloses a holder for a mobile telephone comprising a main body to which a mobile telephone is magnetically attached, and an attachment supporting means for attaching the main body to the surface of an object such as a vehicle dashboard. The magnetic attachment means includes a magnet fixed to the main body, and a piece of iron attachable to the back of the mobile telephone and attachable to the magnet by magnetic force.

U.S. Pat. No. 6,888,940 issued May 3, 2005 discloses a magnetic holder for cell phones and the like. The holder has a cup formed of a ferromagnetic material within which a magnet is supported. The rear surface of the cup includes a double-sided adhesive pad attach the holder to a supporting surface or structure such as a vehicle dashboard. The cell phone is secured to the holder cup magnetic attraction. Differing attachments, such as suction cups or belt clips, may retain the magnetic holder to the dashboard or other support.

U.S. Pat. No. 6,945,503 issued Sep. 20, 2005 discloses a portable magnetic object holder having a mounting plate embedded with at least one magnet for holding a magnetic object, such as a tool or instrument, on one surface of the mounting plate. A strap is attached to the mounting plate for mounting the mounting plate to a user or to an object.

U.S. Pat. No. 7,172,283 issued Feb. 6, 2007 discloses a magnetic eyeglass device for temporarily affixing eyeglasses to articles of clothing worn by the user. A strong pair of magnets is attached with pliable, flexible rings to the eyeglass frames. The magnets connect together when the eyeglass frames are closed, forming a tight hold whenever the glasses are clasped together. The closed eyeglasses can then be easily and securely attached or retained to a belt, pocket, purse, or to an article of clothing.

U.S. Pat. No. 7,431,251 issued Oct. 7, 2008 discloses a magnetic mounting platform for removably retaining hand held devices using magnetic attraction. The magnetic mounting platform attaches to an external mounting surface and holds a permanent magnet.

U.S. Pat. No. 7,441,917 issued Oct. 28, 2008 and U.S. Pat. No. 7,708,421 issued May 4, 2010 discloses illuminated jewelry articles utilizing a magnetically connectable clasp. Each clasp component includes a vertex end and a magnetically attractable base. At least one of the clasp components contains a magnet thereby allowing the clasp components to be magnetically connectable in base-to-base relation without requiring precise manual alignment.

U.S. Pat. No. 7,496,991 issued Avery Mar. 3, 2009 provides a portable securement system for docking eye wear to a user's garment for temporary safekeeping. A pendant holds a magnet secured at the device's bottom to secure eye wear for easy retrieval.

U.S. Pat. No. 7,553,018 issued Jun. 30, 2009 discloses an eyeglass holder attachable to clothing, office and shop equipment, handbags or the like, wherein a magnet can attach the eyeglass holder to a ferrous metallic surface.

U.S. Pat. No. 7,889,036 issued Feb. 15, 2011 discloses another magnetic holding device. The holding device keeps together and releases two elements that are relatively movable to each other.

Other magnetic eyeglass holders are seen in U.S. Pat. No. 7,857,445 issued Dec. 28, 2010, U.S. Pat. No. 6,367,126 issued Apr. 9, 2002, and U.S. Pat. No. 7,296,889 issued Nov. 20, 2007.

Another reference of interest is U.S. Pat. Application Publication No. 2006/0124676, published Jun. 15, 2006.

Thus, despite the prior art aforesaid, there is a need for improved retainers for cell phones (and similar devices), and properly configured magnetic retainers are needed. The orientation of the magnets must be characterized by an alignment that results in maximum holding strength. In other words, there is a need for a connection scheme for an improved magnetic retainer, and its associated attachments, where items retained by the device are held dependably, and do not slide off.

I have found that the connecting magnets must be properly aligned. By way of example, when a phone held with my retainer device is suspended by a lanyard worn about the users neck, the longitudinal axis of the magnets is normal to ground. Stated another way, when my retainer is worn about the neck of a user and hangs down, the poles of the connecting magnets occupy a line such that the north and south poles of a first magnet are vertically aligned with the north-south poles of the other magnet, and the alignment is generally "vertical" or perpendicular to ground.

Further, there is a need for retainers that employ a holder portion removably attached to a cell phone, which holder provides a magnetic union that can be removably coupled to and suspended by a cooperating hanger portion that removably suspends the phone or device from the user. In each instance, it is important that a retainer comprises a hanger and holder that are coupled together magnetically, wherein the holder is removably coupled by magnetic attraction to the hanger.

SUMMARY OF THE INVENTION

This invention comprises a magnetic retainer utilizing various arrangements for detachably holding and suspending items such as cell phones or similar portable electronic devices or tools or accessories from a user, i.e., a human being, or a suitable support.

In preferred forms of the invention the retainer comprises a hanger and a holder. The holder is adapted to be removably attached to an item such as a cell phone, phone case, eyeglasses, tool or the like. The hanger normally removably couples to, or is removably suspended from, a user (i.e., a human being) or a suitable support. The hanger detachably, magnetically couples to the holder.

The hanger may comprise a loop, clip, or lanyard somewhat like a necklace, that is worn or held by a user or attached to the user or a static support. The hanger includes a strong magnet (or ferrous object) at a remote end. The holder includes a similar strong magnet (or ferrous object) at its remote end. Preferably a separate magnet is used in both the hanger and the holder. These magnets vigorously attract each other, and a binding connection is temporarily magnetically established for holding the cell phone or whatever device is coupled to the retainer.

The holder may be retrofitted to the cell phone structure or device in several ways. For example, the holder may comprise an anti-slip connection that is removably, frictionally coupled between the cell phone plastic body and its interior. The preferred anti-slip connection comprises double sided sticky tape that may be sandwiched between abutting surfaces, such as a the plastic case or cover portion or phone case. In the best mode, the preferably flexible anti-slip piece comprises double sided sticky tape, which is removably captivated within the cell phone body sandwiched between phone or phone case parts, preferably with a flexible end piece that leads to a magnet. Alternatively the holder may be releasably coupled to the phone with a connection jack, a harness engaging the cell phone, a clip or coupling that engages a phone jack, a cord or clip, or other device as described below.

In the best mode both the hanger and the holder terminate in strong, permanent magnets adapted to be attractively coupled together, with the north pole of one magnet attracting the south pole of the other. Alternatively, one of the hanger or holder may terminate in mere ferrous material, that is magnetically attracted. With the preferred double magnet configuration there is a superior holding power. Preferably, when the hanger is suspended from a user, the north and south poles of the magnets abut one another in an orientation with the longitudinal axis of the magnets normal to ground.

With both the harness and hanger, alternative mounting arrangements can be used to secure the magnet. In one form of the invention the magnets are restrained by a shrink tube arrangement. In a preferred form of the invention, both the hanger and the holder include terminal snap-fit structure for restraining the magnets.

Accordingly, it is a general object of the present invention to provide an improved retainer for retaining and holding electronic devices including cell phones and phone accessories, and miscellaneous tools and the like.

A basic object is to provide a retainer comprising a holder adapted to be removably coupled to a phone or the like, and a hanger that couples to the holder.

It is a more particular object of the present invention to provide an improved retainer apparatus enabling a user to detachably hold and retain a cell phone or other similar electronic item upon his or her person.

A related object is to provide a retainer device of the character described that makes it convenient to detachably hold and use a cell phone within the confines of a vehicle interior.

It is another object of the present invention to provide improved retainer or keeper devices for cell phones, jewelry, eyeglasses, miscellaneous tools and the like.

Still another object of the present invention is to provide an improved, removable magnetic means for holding cell phones and related digital devices.

Another object of the present invention is to provide an improved retainer for portable devices such as cell phones and other digital devices, wherein the retainer comprises a selectively detachable, magnetically connectable junction.

An object of this invention to provide a strong attraction between two magnetic ends in a cell phone retainer, one magnetic end provided by a holder removably couples to the phone, and the other magnetic end provided by a hanger suspended from or attached to the phone user.

Another object is to provide a retainer in which the poles of the connecting magnets are aligned, such that the longitudinal axis of the magnets is usually disposed perpendicularly relative to ground when the cell phone hanger comprises a lanyard or necklace suspended from a standing user.

Another object of the present invention is to provide a retainer of the character described that can connect to a phone output jack or port.

A basic object is to provide a universally applicable, detachable magnetic retainer device that is suited for reliably restraining and conveniently holding cell phones and the like.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE DRAWINGS

Figure 1:
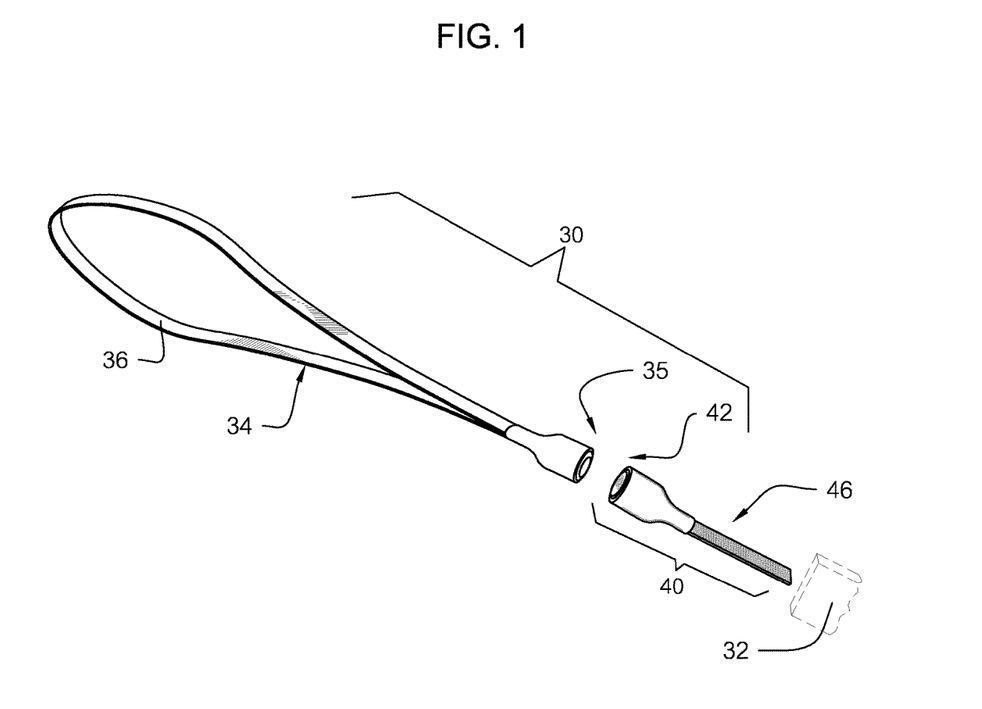
FIG. 1 is a fragmentary perspective view of a retainer constructed in accordance with the best mode of the invention known to me at this time.
Figures 2, 3:
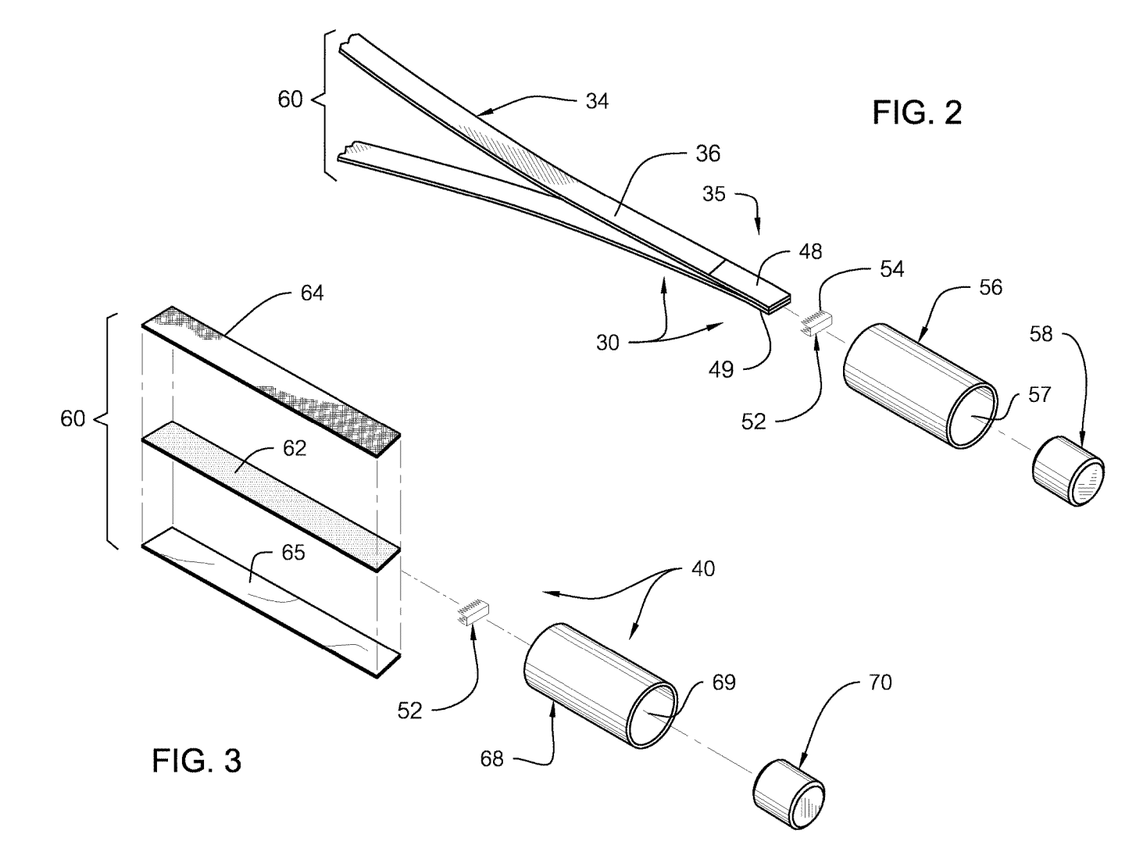
FIG. 2 is an enlarged, partially exploded, fragmentary, isometric view of the heat-shrinked hanger used with the retainer of FIG. 1.
FIG. 3 is an enlarged, partially exploded, fragmentary, isometric view of the heat-shrinked holder used with the retainer of FIG. 1.

With initial reference directed to FIGS. 1-3, a preferred retainer constructed in accordance with the best known mode of the invention has been generally designated by the reference numeral 30. Retainer 30 is adapted to be worn by a cell phone user, so that the cell phone may be suspended and thus retained and supported conveniently for manipulation, support, and use. A generic cell phone is designated generally by the reference numeral 32 in FIG. 1. Retainer 30, and all other retainers disclosed herein, comprise two primary pieces, namely a hanger and a holder, with the holder being magnetically and removably attached to or suspended by the hanger. Each hanger described is suspended or supported by the users body (i.e., his or her neck) or by a suitable support. Each holder described herein removably couples to the cell phone 32 or its case or liner, or to an alternative item to be transported.

For example, the preferred retainer 30 (FIG. 1) comprises a hanger 34 having a looped lanyard 36 worn about a users neck. Hanger 34 can have other configurations. The lanyard 36 terminates in a remote end, generally designated by the reference numeral 35, that houses a high strength, permanent magnet. Similarly, the holder 40 has a second remote end 42 which, in the best mode, houses another permanent magnet that selectively couples with the the lanyard-supported other magnet. In the best mode all magnets are high strength, rare-earth permanent magnets, and neodymium magnets are preferred. The preferred holder 40 has a "sticky tape" portion 46 that removably connects to the cell phone 32 (or other item being carried or supported) as explained in detail hereinafter, to form a non-slip connection.

As best seen in FIG. 2, the lanyard 36 preferably comprises an elongated fabric or plastic strap that is formed into a loop with spaced-apart, strap ends 48 and 49 flatly placed together as shown in FIG. 2. The strap ends 48, 49 are preferably held together and crimped with a metallic retainer clip 52 that is forcibly compressed about them for retention. In vertical cross section the clip 52 is somewhat C-shaped. When clip 52 is installed, the serrated clip edges 54 (FIG. 2) bind against and restrain the strap ends 48, 49. In the best mode, an elongated connection sleeve 56 made of heat shrink tubing fits over the crimped strap ends 48, 49 and the compressible clip 52 binding them. The open end 57 of tubular sleeve 56 receives a cylindrical, permanent magnet 58. Once the heat shrink tubing sleeve 56 is secured by appropriate heat, the first remote end (i.e., the hanger end) 35 is complete. Alternatively, the lanyard 36 can have a tubular shaped magnet, or magnets threaded onto the strap body or ends 48,49.

FIG. 3 details the preferred holder 40 employed with the preferred retainer 30. Holder 40 comprises an elongated, flexible sticky-tape portion 60 that comprises an adhesively coated body 62 and at least one (preferably two) tear away strips 64 and/or 65 that are peeled away and removed by the end user to expose adhesive. The tear strips 64 and/or 65 are merely peeled away. The sticky tape portion 60 is preferably crimped by another clip 52 identical with that described above. The crimped ends of the sticky tape are surrounded by the tubular, heat-shrink tubing sleeve 68 whose open end 69 receives a permanent magnet 70. The second remote end 42 referenced in conjunction with the above discussion of FIG. 1 is thus completed when the shrink tubing sleeve 68 contracts about the assembly in response to heating.

Figure 4:
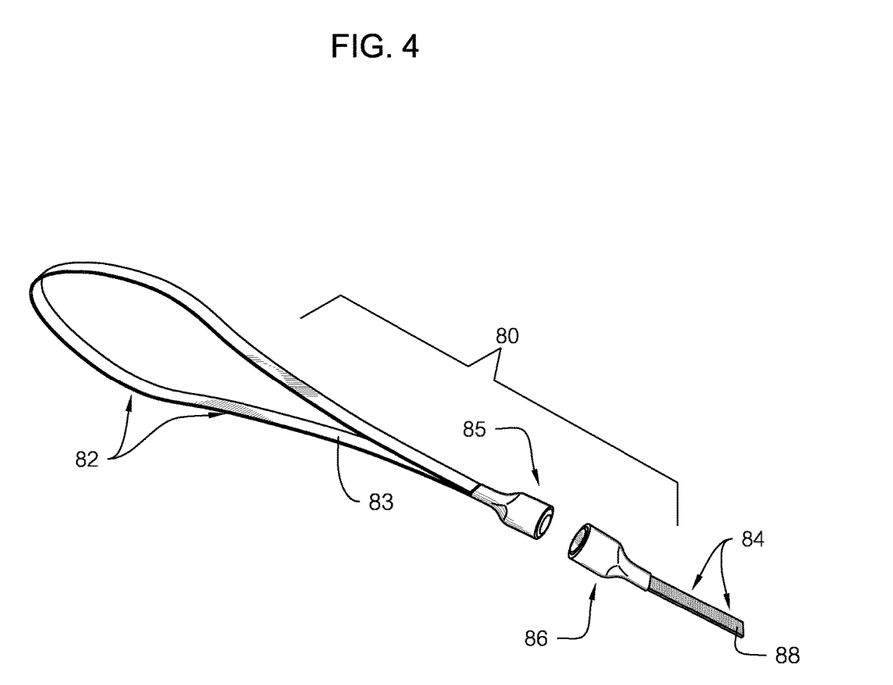
FIG. 4 is fragmentary, perspective view of an alternative retainer, employing a snap-together hanger and snap-together holder.

FIG. 4 illustrates a primary alternative retainer embodiment. Retainer 80 comprises a hanger 82 and a holder 84. Hanger 82 is formed of an elongated strap 83, whose ends are coupled together and form a remote end 85 that houses a magnet. The holder 84 has a cooperating magnetic end 86, and a sticky tape portion 88 adapted to be removably coupled to a cell phone or other item being transported or retained by the retainer 80.

Figures 5, 6:
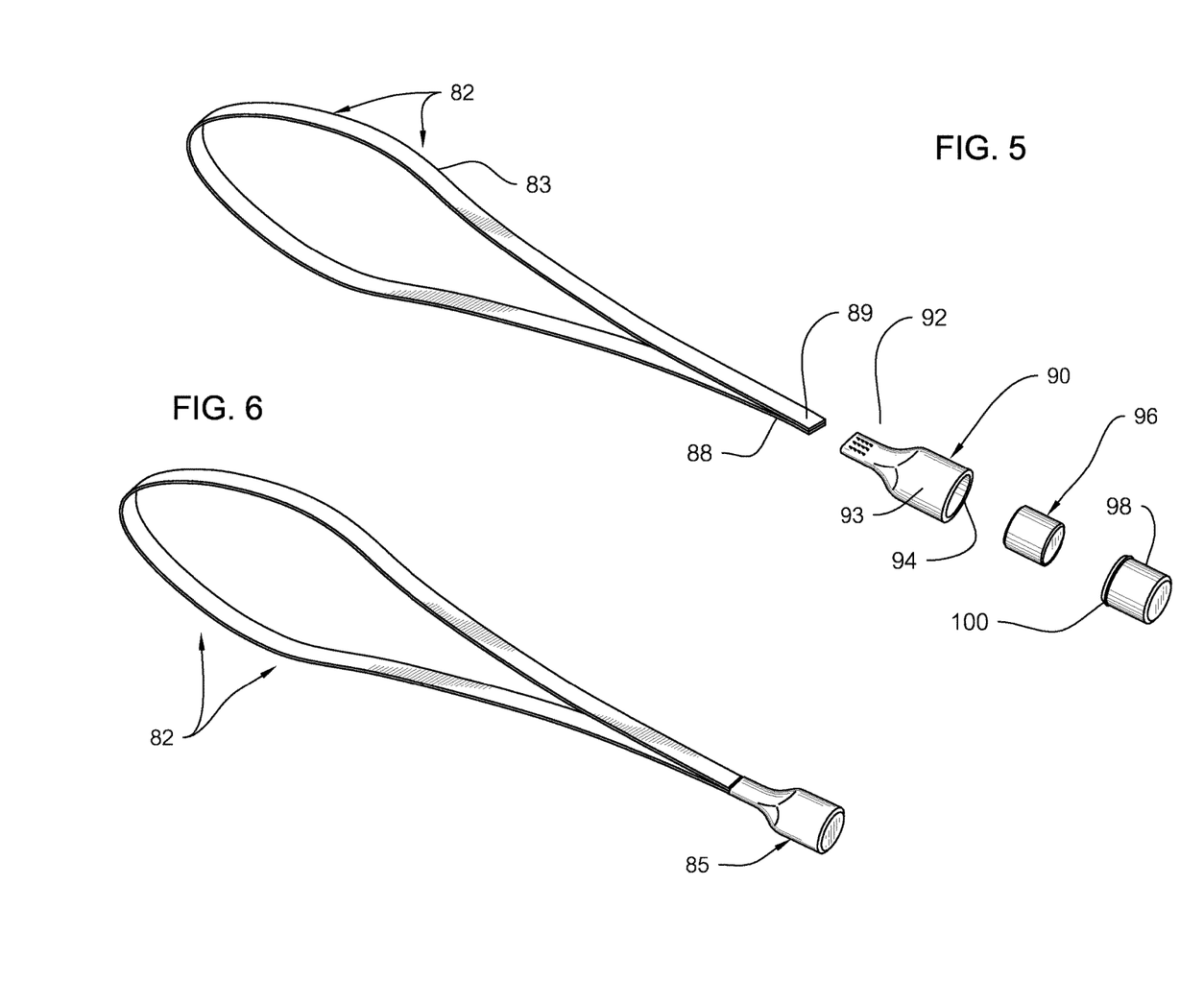
FIG. 5 is an enlarged, partially exploded, fragmentary perspective view of the snap-together hanger preferably used with the retainer of FIG. 4.
FIG. 6 is an enlarged, isometric view similar to FIG. 5 showing the assembled snap-together hanger preferably used with the retainer of FIG. 4.

Referencing FIG. 5, hanger 82 comprises an elongated strap 83 formed into a lanyard with the ends 88, 89 secured together. These ends 88, 89 fit into the narrowed end 92 of an injection-molded, plastic adaptor 90, where they are retained by compression and a plurality of alligator teeth formed in end 92. Adaptor 90 comprises an integral, somewhat tubular socket 93 having an open end 94. A permanent magnet 96 is held within socket 93, being retained by a cap 98 that is fitted within socket 93 through open end 94. Cap 98 has an integral snap ring 100 that seats within an internal ring groove, the details of which are discussed hereinafter in conjunction with a description of FIG. 12. The assembled hanger 82 seen in FIG. 6 has a remote end 85 that is magnetically coupled to a similar magnetic remote end on the companion holder seen in FIGS. 7 and 8.

Figures 7, 8:
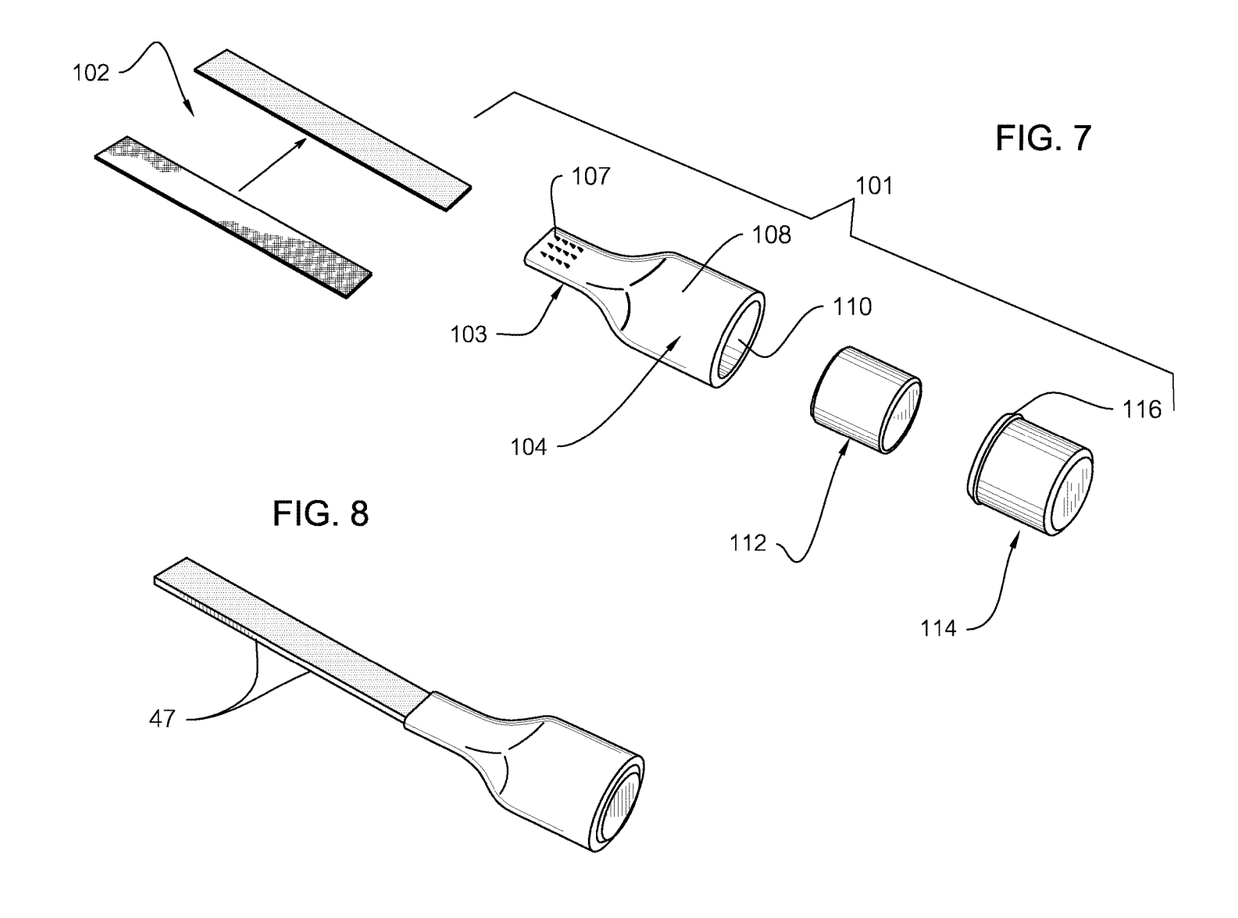
FIG. 7 is an enlarged, partially exploded, fragmentary perspective view of the snap-together holder preferably used with the retainer of FIG. 4.
FIG. 8 is an enlarged isometric view similar to FIG. 7 showing the assembled snap-together holder preferably used with the retainer of FIG. 4.

Referring to FIG. 7, the holder 101 comprises a sticky tape portion 102 that is similar to portion 60 (FIG. 3) discussed earlier. The sticky tape portion 102 fits within the flattened end 103 of the adaptor 104, which is similar to adaptor 90 discussed above. Socket 108 receives a magnet 112 and a cap 114 through orifice 110. A snap ring 116 integrally formed on the shank of cap 114 snap fits to adaptor 104, being seated within an internal ring groove formed in socket 108. (Details of the latter construction are discussed hereinafter in conjunction with a description of FIG. 12).

Figures 9, 10, 11:
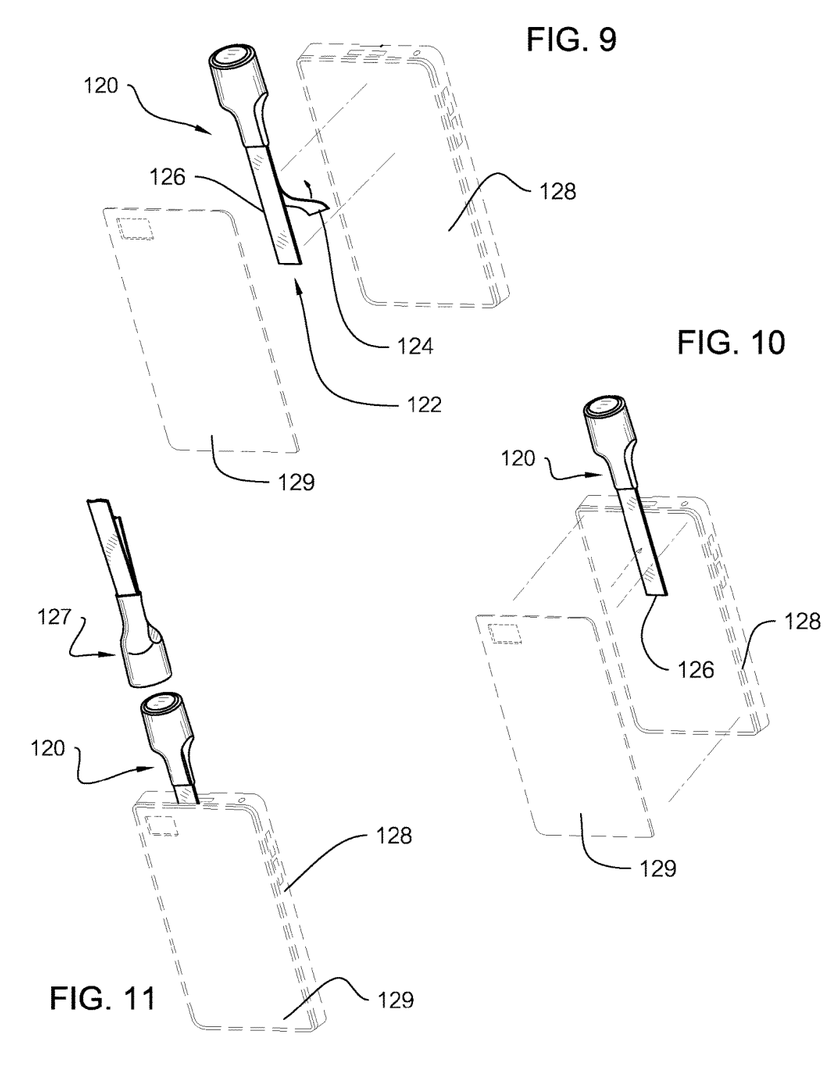
FIGS. 9-11 are sequential, fragmentary diagrammatic views showing the preferred method in which the various holders depicted herein are removably attached to a cell phone.

FIGS. 9-10 illustrate how the sticky tape portion of the preferred holders removably interconnects with a cell phone, a cell phone case or jacket, or the like. Here a holder 120, constructed like the previously discussed holder 101, for example, has a sticky tape portion 122. One or more peel-away strips 124 are removed from the body strip 126. The exposed, adhesively coated strip 126 is sandwiched between cell phone parts, or between portions of the cell phone and its jacket or case or protective wrapping. For example, the sticky tape can be placed between the phone 128 and a backing 129, which may comprise a plate, a cell phone wrapper, or cell phone case or the like. When the the backing 129 reinstalled as illustrated in FIG. 10, the holder will be retained as in FIG. 11, wherein the holder 120 may be magnetically captivated by and mated to a magnetic hanger 127.

Figure 12:
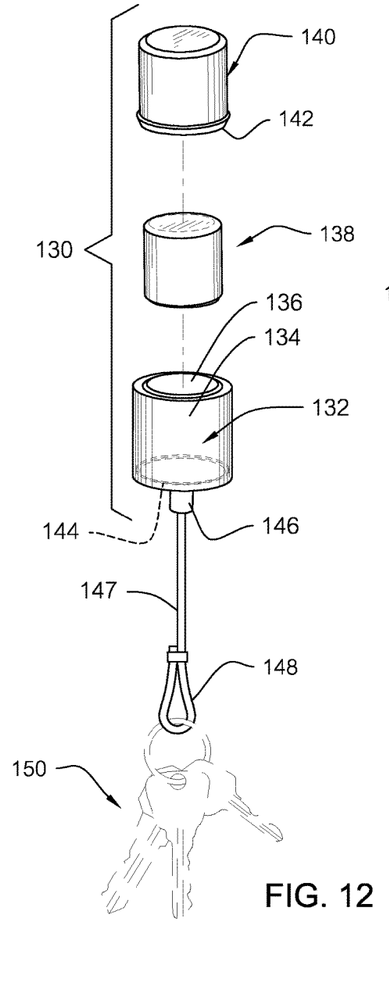
FIG. 12 is a partially exploded, isometric view showing an alternative snap-together holder.

FIG. 12 shows an alternative holder 130 which can be used with the previously described hangers to make retainers of varying configurations that are suitable for diverse uses. Holder 130 comprises an alternative adaptor 132, preferably injection molded from plastic. There is a socket 134 that is similar to socket 93 (FIG. 5). An orifice 136 receives a cylindrical permanent magnet 138 which is retained by a cap 140. The integral snap ring 142 is seated within the internal ring groove 144 (FIG. 12) defined within socket 134. Adaptor 132 also comprises an integral, downwardly projecting tab 146 from which an elongated support 147 comprising a wire, chain, cord, or string hangs. Support 147 terminates in an attachment such as a suitable clasp 148 for grasping diverse items such as a ring of car keys 150, eyeglasses, or the like.

Figure 13:
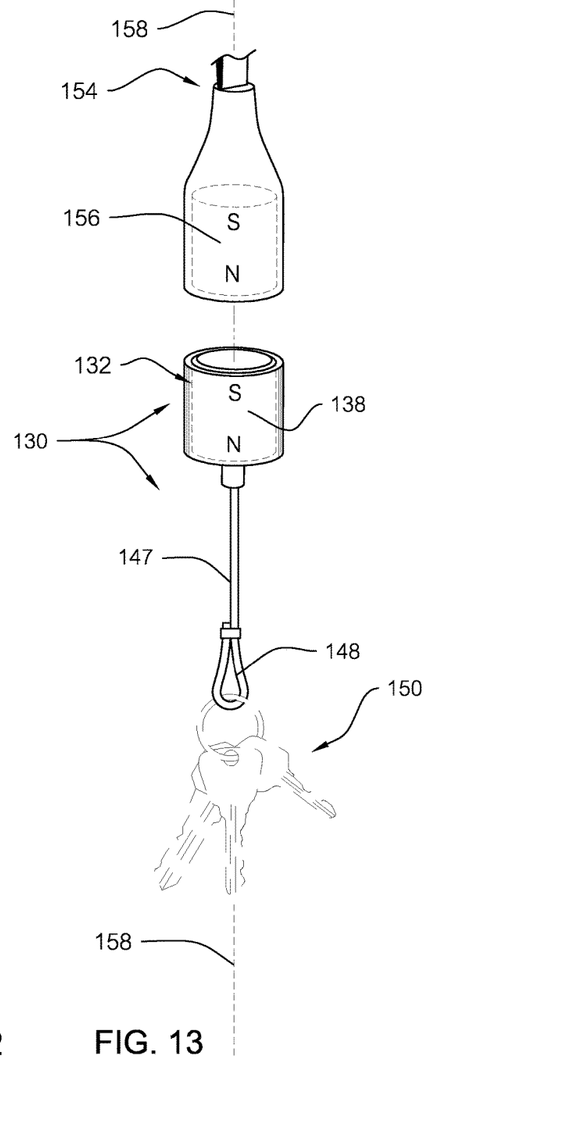
FIG. 13 is partially exploded, isometric view showing an alternative snap-together holder spaced-apart from the hanger, and showing the preferred vertical magnet alignment.

FIG. 13 shows the holder 130 described in FIG. 12 as before. However, the magnet 138 disposed within the adaptor 132 has been drawn with phantom lines, with the north and south poles identified. A generic hanger has been identified with the reference numeral 154, and its magnet 156 has been similarly drawn, showing its poles, i.e., "S" and "N". The longitudinal axis of a hanging retainer formed by holder 130 and hanger 154 is identified by the reference numeral 158 in FIG. 13. Here it can be seen that the "north" pole of the uppermost magnet 156 is aligned with the attractive "south" pole of the adjacent lower magnet 138. (Of course these poles can be reversed). Moreover, the longitudinal axis of each generally cylindrical magnet 138 and/or 156, forming a line running between the magnet's north and south poles, is coincident with the longitudinal axis 158, which is generally perpendicular to ground. This disclosed orientation is referred to herein as "vertical" and it is preferred in all embodiments to obtain maximized magnetic holding strength between the hanger and the holder. The axis of the aligned magnets is perpendicular to ground or the lower floor, by way of example, upon which a user may be walking or standing.

Figure 14:
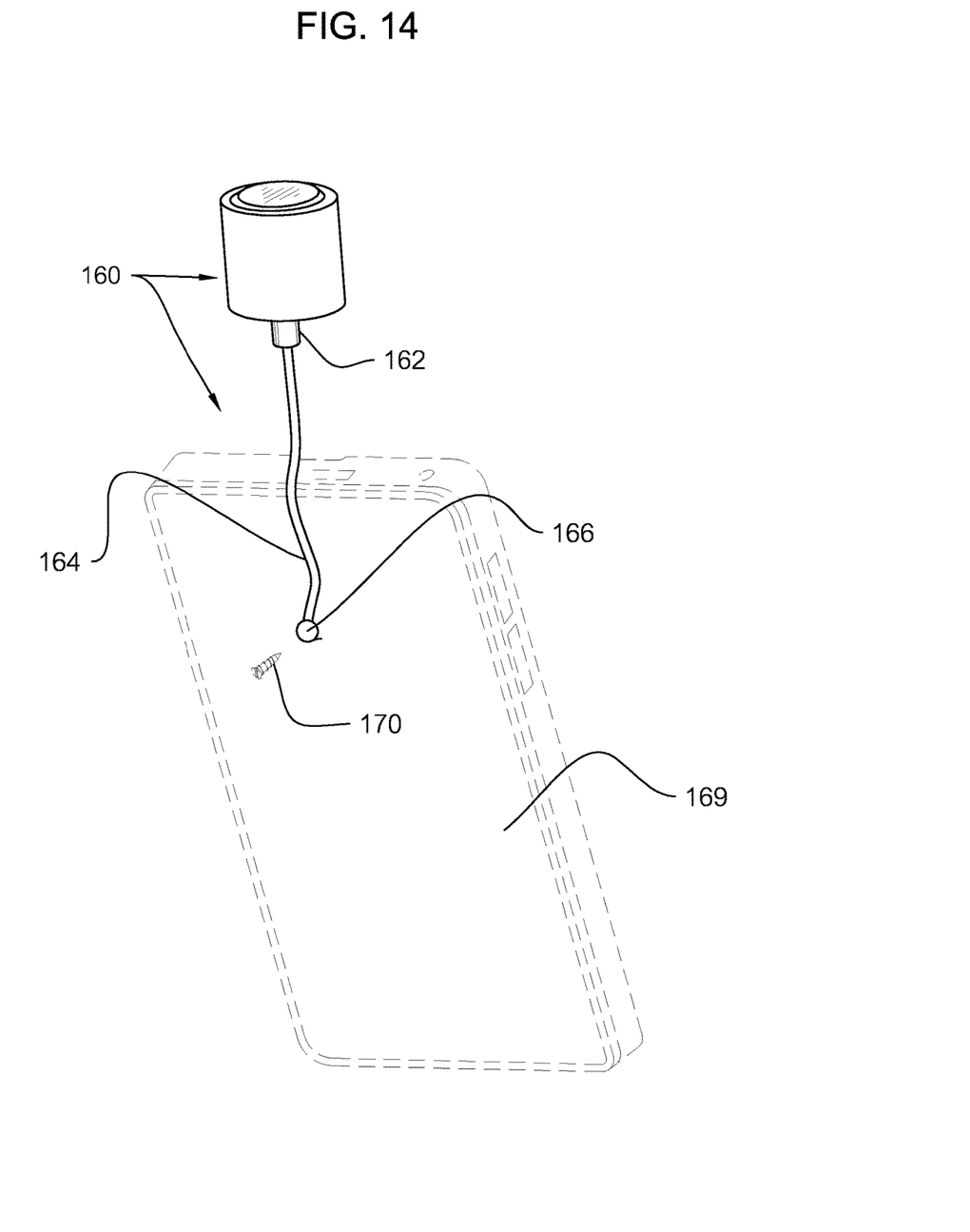
FIG. 14 is an isometric view of an another alternative snap-together hanger that is permanently attached to a cell phone case.

FIG. 14 illustrates an alternative holder 160 that is similar to holder 130 (FIG. 12) discussed above. Holder 160 has a tab 162 supporting a cord or chain 164 leading to a termination 166. A predefined orifice in the rear of the cell phone 169, that is preferably threaded, can permanently fasten to termination 166 with a machine screw 170.

Figures 15, 16, 17:
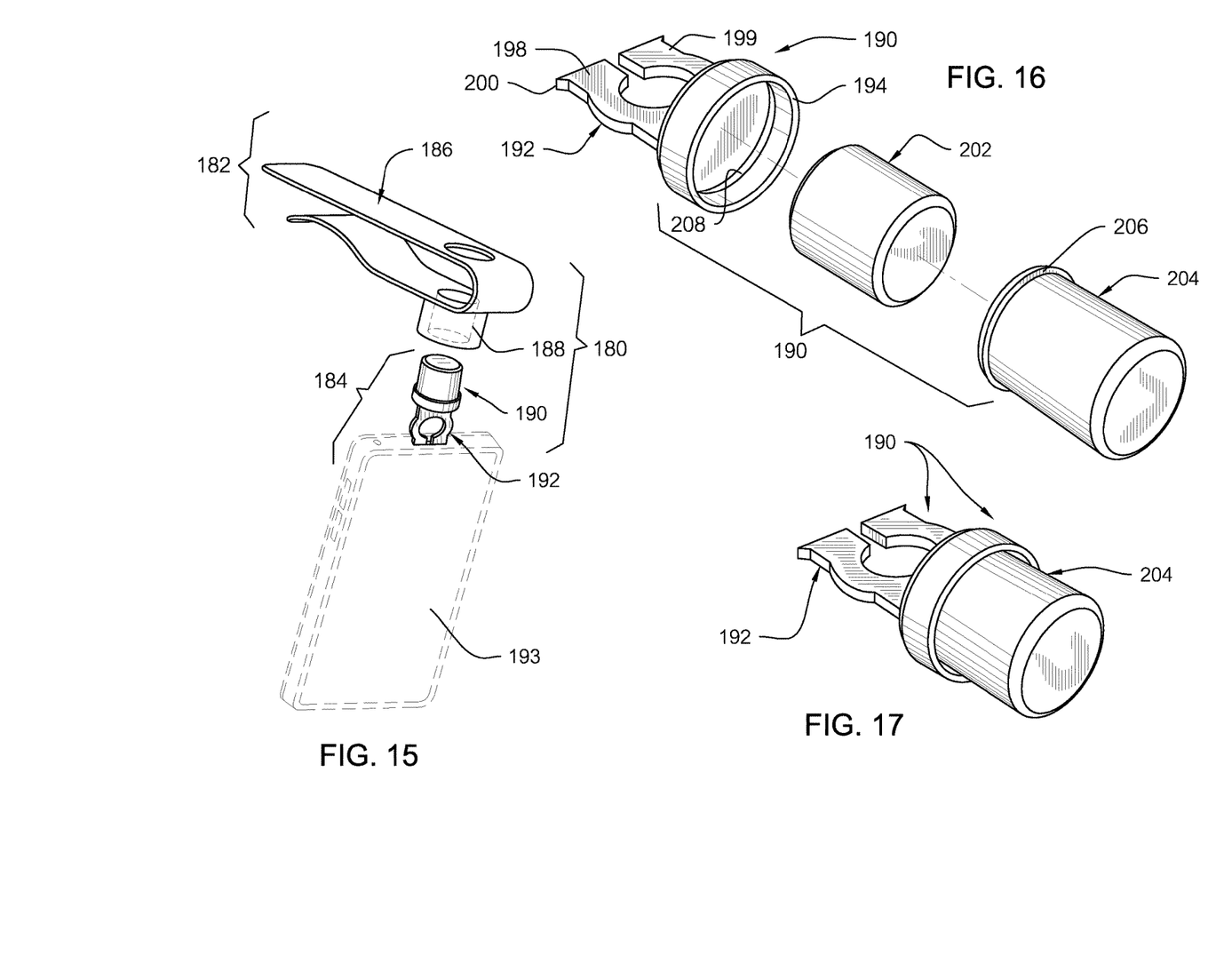
FIG. 15 is a partially exploded, isometric view of another alternative embodiment of a retainer, utilizing a sun-visor hanger and a cooperating, port engaging holder.
FIG. 16 is an enlarged, exploded isometric view of the port-engaging holder of FIG. 15.
FIG. 17 is an enlarged, isometric view of the assembled port-engaging holder of FIG. 15.

Referring now to FIGS. 15-17, an alternative retainer generally designated by the reference numeral 180 comprises a hanger 182 and a holder 190. The hanger 182 comprises an arcuate, resilient clip 186 that supports a magnet-mounting socket 188. Preferably socket is integral with, and perpendicular to, clip 186. In use, the clip 186 can be slidably attached to a suitable support such as an automobile sun visor, for example, where, in use, it may assume a substantially horizontal orientation. The holder 190 comprises a molded plastic fitting that holds a similar magnet. An integral plug portion 192 can seat within a cell phone 193, a cell phone case, or other device, within a mating port, to hold the cell phone. A suitable port can comprise a socket or jack or receptacle or terminal. In FIG. 16 it is seen that the plug portion 192 of holder 190 comprises a tubular socket 194 that is integral with plug portion 192. There are two spaced apart and deflectable plug wings 198, 199 with locking notches 200 for seating within a suitable port or phone jack or female receptacle. Socket 194 concentrically receives a permanent magnet 202 that is captivated by a tubular plug 204. The integral, peripheral ring 206 on plug 204 seats within a ring groove 208 (FIG. 16) defined within socket 194 so that the fitting 190 snap fits together. When so assembled, it has the appearance seen in FIG. 17.

Figure 18:
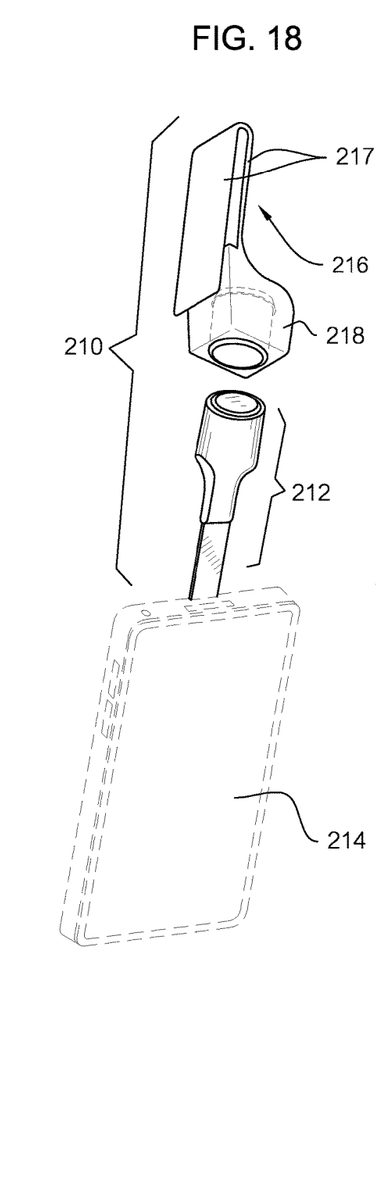
FIG. 18 is an enlarged, exploded isometric view of another alternative embodiment of a retainer, utilizing a belt clip hanger and a holder of the type seen in FIG. 5.
Figure 19:
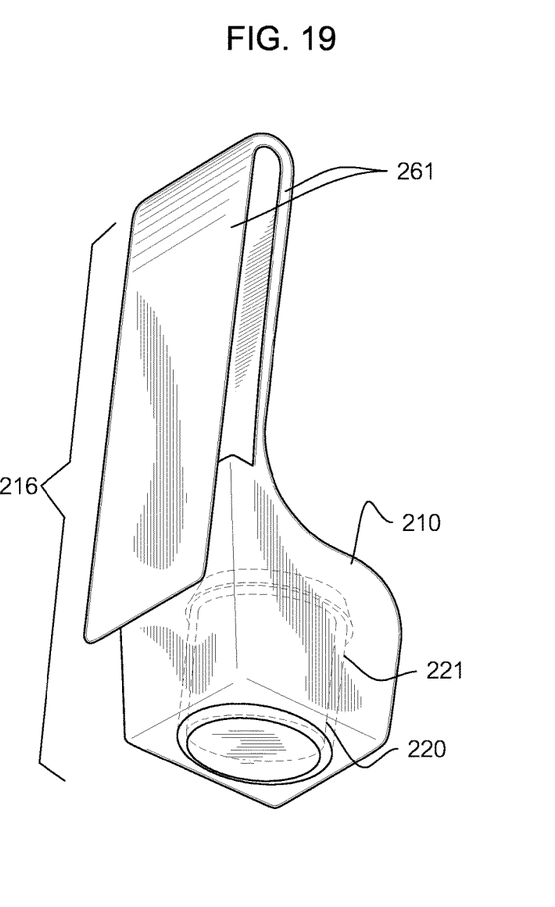
FIG. 19 is an enlarged isometric view of the belt-clip hanger of FIG. 18.

FIGS. 18 and 19 show another retainer 210. In this instance, a holder 212 constructed as detailed above is attached to a device 214. The hanger 216 is in the form of a belt clip, with a resilient arcuate portion 217 that clips to a wearers belt in the usual fashion. An integral socket 218 contains a magnet of the type discussed several times above. The hanger 216 can thus removably, magnetically support the holder 212 and the device 214 supported by it. In FIG. 19 it is seen that the socket 218 can house a magnet with a suitable snap-fit cup 221 equipped with a snap ring that seats within a ring groove within socket 218 in the manner described previously.

Figure 20:
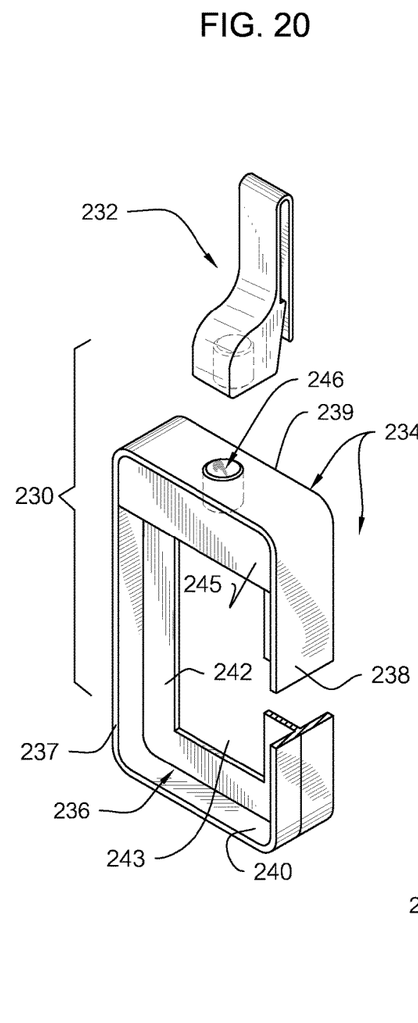
FIG. 20 is a partially exploded, fragmentary isometric view of an alternative retainer, wherein a snap fitted holder is fitted to a cell phone case.

With reference now directed to FIG. 20, an alternative retainer employing a modified cell phone case as a holder is generally designated by the reference numeral 230. In this instance the hanger 232 comprises a belt clip similar to that described earlier in conjunction with FIGS. 18, and 19. However, the hanger 232 can alternatively be a lanyard, a sun visor clip, or suitable support. Importantly, however, the holder 234 comprises a cell phone case that is magnetically attracted to the hanger 232.

The preferably plastic injection-molded, cell phone case (FIG. 20) is in the general form of an open parallelipiped. There is an open front 236 for nestably receiving a cell phone, that is surrounded by peripheral sidewalls 237 and 238 that are integral with a top 239 and a bottom 240. The open front 236 is bounded by a rear wall 242 that surrounds and borders an open rear 243. Top 239 is reinforced and solid, comprising an integral, transverse portion 245 extending between sidewalls 237 and 238. Importantly, there is a high strength permanent magnet 246 permanently disposed within case top panel 245 during the injection molding manufacturing process. Panel 245 must be strong enough and dimensioned properly to handle the magnet. Preferably the magnet is similar to those discussed above. Retainer 230 thus transports a cell phone, ensconced within the case, by magnetic attraction between the selected hanger 232 (or other hangers described herein) and the encapsulated magnet 246.

Figure 21:
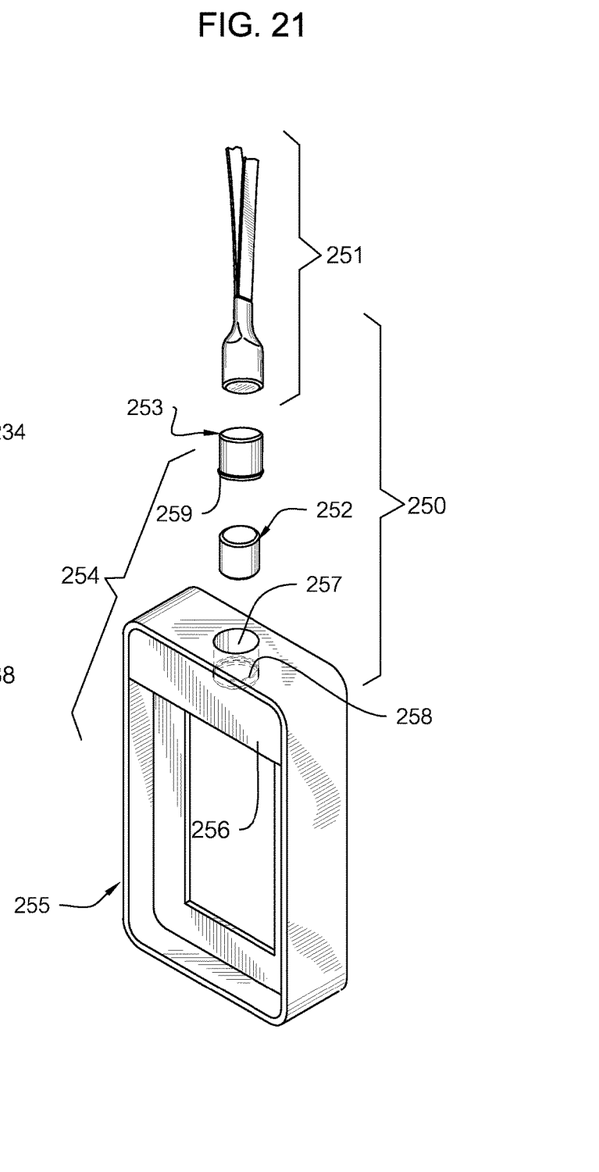
FIG. 21 is a partially exploded, fragmentary isometric view of an another alternative retainer similar to that seen in FIG. 20, wherein a snap fit holder fitted to a cell phone case is used with a lanyard type holder.

The retainer 250 seen in FIG. 21 involves a similar, plastic injection-molded case. Here, retainer 250 comprises a hanger 251 that interacts with a holder 254. The illustrated hanger 251 is the lanyard type discussed above in conjunction with FIG. 1. However, other hangers discussed herein may be utilized. Importantly, the holder 254 employs a magnet 252 that is snap fitted to a suitable socket within the cell phone case 255 for interaction with the selected hanger 251 in a manner similar with retainer 230 (FIG. 20).

The preferred holder 254 used with retainer 251 (FIG. 21) comprises an injection-molded cell phone case 255 that is substantially similar to the case shown in FIG. 20 that has already been described in detail. However, the rigid, upper panel 256 comprises an upper socket 257 that includes an internal ring groove 258. Socket 257 receives the cap 253 that captivates magnet 252 and secures it within panel 256. The cap 253 has an integral snap ring 259 that snap fits within and mates to the ring groove 258 in socket 257. This snap-fitting arrangement has been discussed in detail earlier herein in conjunction with a description of FIGS. 12 and 16, for example. Thus the holder 254 (FIG. 21) utilizes a snap-fitted magnet mounting assembly that can be assembled after the case injection molding process. Of course, holder 254 may be employed with a variety of hangers described herein as well.

Figure 22:
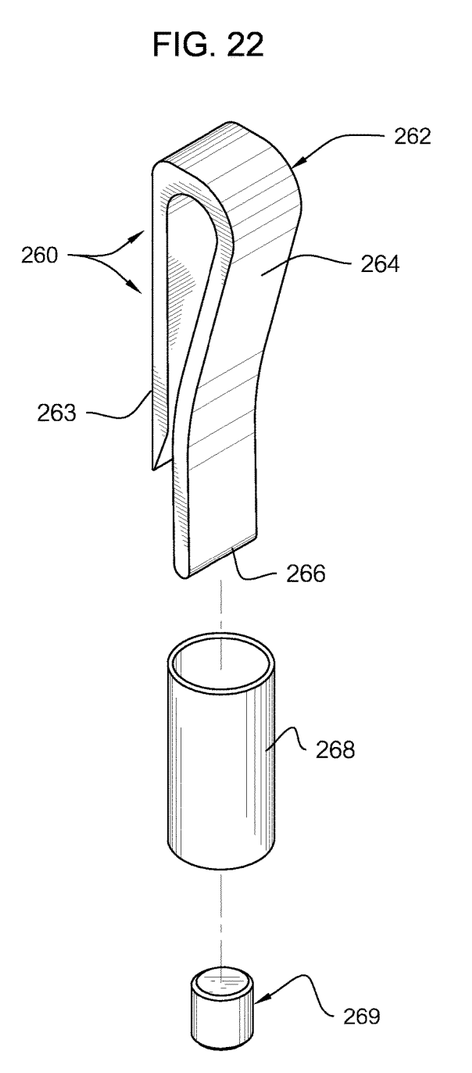
FIG. 22 an exploded isometric view of a heat-shrink hanger.
Figure 23:
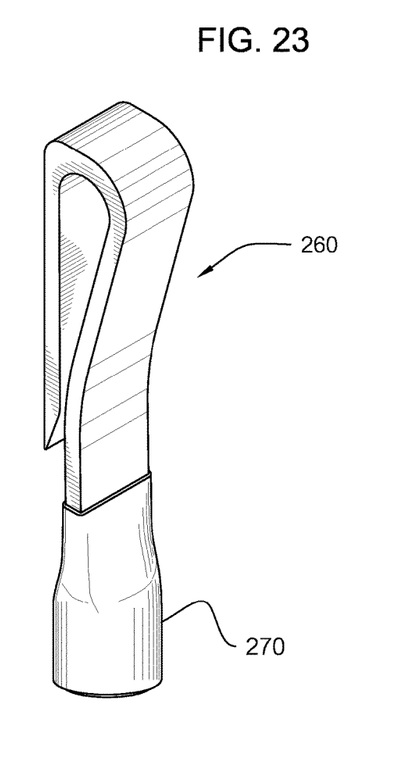
FIG. 23 is an isometric view of an assembled heat shrink hanger.

FIGS. 22 and 23 show a modified hanger 260. Here, a resilient, curved, plastic hook 261 has a straight portion 263 and an integral curved portion 262 that terminates in a lower frontal portion 266. Portion 263 clips the unit to a wearers belt. Portion 266 receives a piece of tubular heat shrink wrap forming a sleeve 268, that captivates a magnet during assembly. The shrunk, heat treated bottom has been designated by the reference numeral 270 in FIG. 23. Here the shrink tube sleeve 268 is heat shrunk into the "assembled" configuration 270.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. A retainer for detachably holding or suspending a cell phone from a human user or a suitable support, the retainer comprising:
   a hanger adapted to be removably coupled to or removably suspended from said human user or suitable support, the hanger terminating in a first remote end supporting a first magnet;
   a holder adapted to be attached to said cell phone, the holder terminating in a second remote end supporting a second magnet;
   wherein the hanger detachably, magnetically couples to the holder with said first and second remote ends abutting each other with said first and second magnets attracting one another;
   wherein the holder comprises an anti-slip connection spaced apart from said second remote end that can be sandwiched between the cell phone and a cell phone case or between a cell phone cover portion and the cell phone interior
   wherein the anti-slip connection is established by sticky tape; and
   wherein the first remote end is connected to said first magnet with a first heat shrink tubing and said second remote end is connected to said second magnet with a second heat shrink tubing.

2. A retainer for detachably holding or suspending a cell phone from a human user or a suitable support, the retainer comprising:
   a hanger adapted to be removably coupled to or removably suspended from said human user or suitable support, the hanger terminating in a first remote end supporting a first magnet;
   a holder adapted to be attached to said cell phone, the holder terminating in a second remote end supporting a second magnet;
   wherein the hanger detachably, magnetically couples to the holder with said first and second remote ends abutting each other with said first and second magnets attracting one another;
   wherein the holder comprises an anti-slip connection spaced apart from said second remote end that can be sandwiched between the cell phone and a cell phone case or between a cell phone cover portion and the cell phone interior;
   wherein the anti-slip connection is established by sticky tape; and,
   a snap fit connection coupling said hanger to said first magnet and a snap fit connection coupling said holder to said second magnet, wherein each of said last mentioned snap fit connections comprises a socket for housing a magnet, and a cap adapted to be snap fitted to said socket for enclosing and captivating the magnet.

* * * * *